United States Patent Office 3,542,749
Patented Nov. 24, 1970

3,542,749
NOVEL ETHYLENE COPOLYMERS AND SELF-SUPPORTING FILM PREPARED THEREFROM
Harry D. Anspon, Kansas City, Mo., assignor to Gulf Research & Development Company, Pittsburgh, Pa., a corporation of Delaware
No Drawing. Original application Mar. 7, 1968, Ser. No. 711,213, now Patent No. 3,489,824, dated Jan. 13, 1970. Divided and this application Apr. 30, 1969, Ser. No. 827,464
Int. Cl. C08f 15/00
U.S. Cl. 260—86.7    5 Claims

ABSTRACT OF THE DISCLOSURE

Novel ethylene copolymers are provided in which the polymer contains polymerized ethylene and polymerized oleyl acrylate, erucyl acrylate, N-oleyl acrylamide, N-erucyl acrylamide or any mixture thereof. Such copolymers, and blends of such copolymers with ethylene homopolymers, when fabricated into polymer film, exhibit a low coefficient of friction and good antiblocking properties.

This application is a division of application Ser. No. 711,213, filed Mar. 7, 1968, now U.S. Pat. No. 3,489,824, Jan. 13, 1970.

BACKGROUND OF INVENTION

One of the recognized deficiencies of ethylene polymer films such as polyethylene film is that such films have a relatively high coefficient of friction and strong blocking properties. In the manufacture of such films it is customary to incorporate into the polymer a material which blooms to the surface of the film and functions as a lubricant. Such materials are referred to in the art as slip agents. Although a wide variety of materials have been proposed for use as slip agents in ethylene polymer films, only two compounds are widely used for this purpose, viz, oleamide and erucamide. Ethylene polymer films containing oleamide and/or erucamide as a slip agent are subject to a member of known short comings. First, such films frequently have an undesirable odor. Second, these slip agents frequently exude from the polymer at an extremely rapid rate and/or are volatilized from the polymer and deposit on surfaces which come into contact with the film. This is particularly the case when the polymer is extruded by a chill roll casting method or by a blown film method in which internal formers or mandrels are employed. The deposition of the slip agent on such surfaces which come into contact with the film frequently will cause imperfections in the film. Third, the rapid exudation of these amides to the surface of the film frequently over lubricates the film surface so that it is difficult to wind the film tightly upon a core. This phenomenon is sometimes referred to as telescoping.

SUMMARY OF INVENTION

This invention provides certain ethylene copolymers which, when employed alone or in blends with ethylene homopolymers, can be fabricated into self-supporting films which have low coefficients of friction and good antiblocking characteristics and which are essentially free of the short comings of prior art compositions which contain externally added slip agents such as oleamide and erucamide. The ethylene copolymers of the present invention contain therein (a) polymerized ethylene groups and at least one polymerized monomer selected from the group consisting of (b):

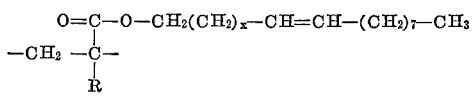

and (c):

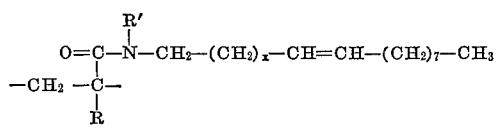

wherein $x$ is 7 or 11, and R and R' are independently selected from the group consisting of hydrogen and a methyl group. The groups (a) constitute at least 50 mol percent of the polymerized monomer units contained in the copolymer and the groups selected from the group of (b) and (c) constitute at least about 5 mol percent of the monomer units contained in the copolymer.

In one embodiment of the invention, the copolymers also contain therein polymerized monomer units of the formula:

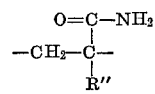

where R" is selected from the group consisting of hydrogen and a methyl group.

When such copolymers or blends of such copolymers with ethylene homopolymers are fabricated into self supporting films by conventional extrusion processes, they are free of the processing difficulties associated with the fabricating of self supporting films from ethylene polymer compositions containing externally added slip agents such as oleamide and erucamide.

DETAILED DESCRIPTION OF INVENTION

The following examples are set forth to illustrate more clearly the principle and practice of this invention to those skilled in the art. Except where otherwise noted, where parts or percentages are set forth, they are parts or percentages by weight.

EXAMPLE I

This example describes the preparation of a copolymer of ethylene and oleyl acrylate. To an apparatus consisting of a round bottom flask fitted with a reflux condenser and a distillation take off head are charged one thousand parts of xylene, 50 parts of a copolymer having polymerized therein 80 weight percent ethylene and 20 weight percent methyl acrylate (prepared by the process of U.S. 3,350,372) a quantity of oleyl alcohol stoichiometrically equivalent to the methoxy moiety of the polymerized methyl acrylate, and 1.0 part of lithium 2-ethyl hexoate. The reaction mixture is heated gently and by the time that reflux has begun the copolymer has dissolved in the hot xylene. Methanol is liberated in the reaction by ester interchange with the oleyl alcohol and the reaction is driven to completion by taking off the azeotrope formed between methanol and xylene. The reaction is complete when the temperature of the reflux being taken off reaches the boiling point of xylene.

After cooling to about 60° C., the contents of the reaction mixture are dumped into one thousand parts of cold methanol to precipitate the polymer. The polymer is recovered by filtration and is successively washed with methanol and water and thoroughly dried in a vacuum oven.

EXAMPLE II

This example describes the preparation of a copolymer of ethylene and N-erucyl acrylamide.

A Magna-Drive autoclave is charged with 100 parts of water, 10 parts of a copolymer of 95 mol percent ethylene and 5 mol percent acrylate, 0.1 part caustic soda, and 26 parts of erucyl amine. The reactor is sealed, heated to 250° C. and agitated for a period of 8 hours. After cooling to room temperature, the reactor is vented and the ethylene-N-erucyl acrylamide copolymer is recovered as a suspension of fine particles in water. The polymer is recovered by filtration, successively washed with dilute hydrochloric acid, water, and methanol and dried in a vacuum oven.

EXAMPLE III

Part A

Thirty parts of the polymer of Example I are blended with seventy parts of a film grade polyethylene resin having a density of 0.92 and a melt index of 2 by Banburying the materials for ten minutes at a temperature of about 270° F. in a laboratory-size Banbury mixer. The resulting polymer composition is sheeted out on a roll mill and comminuted to a particle size suitable for extrusion.

Part B

The polymer composition of Part A is converted into film by extruding the composition in a two inch laboratory extruder equipped with a four inch diameter tubular film die. The polymer is extruded at a die temperature of 375° F. and the bubble is inflated to form a ten inch wide tubular film lay-flat. The film thickness is approximately one mil. The film as thus prepared will have a kinetic coefficient of friction of about 0.2 as measured by the standard ASTM test method. The film, when treated with a corona discharge, will be readily printable with inks conventionally used in the polyethylene film converting industry.

EXAMPLE IV

The polymer of Example II can be converted into film employing conventional laboratory scale chill roll casting equipment consisting of a two inch extruder fitted with a 36" coat hanger type slot die having approximately a 20 mil orifice. The chill roll should be located approximately 1" from the die opening. The film is extruded at a die temperature of about 525° F. and wound upon a core at such a rate that the 20 mil web emerging from the die is immediately drawn down to a thickness of about 1 mil before contacting the chill roll. Good quality film is obtained.

The ethylene copolymers of this invention conform to the structure set forth earlier in this specification. To have a sufficiently low coefficient of friction when these copolymers are employed for conversion into film, the polymerized monomer units corresponding the formulae of (b) and (c) should constitute at least about 5 mol percent of the monomer units contained in the copolymer. For similar reasons, when the copolymers are employed in blends with an ethylene homopolymer, the polymerized monomers of Formulae b and c should constitute at least about 0.1 mol percent of the polymerized monomer units contained in both the ethylene copolymer and the ethylene homopolymer.

The copolymers of the invention can be prepared by directly copolymerizing ethylene with the appropriate monomer employing conventional polymerization techniques well known in the art. When such polymerizations are run, if desired, other monomers also can be included in the polymerization reaction subject to the limitation that in the final polymer product the polymerized monomer of the Formulae b and c will be within the molar range previously described and the polymerized ethylene will constitute at least 50 mol percent of the copolymer. Typical monomers that can be included in such copolymers includes vinyl acetate, vinyl pyrrolidinone, and other monomers which are known to copolymerize with ethylene. While the copolymers can be prepared by direct copolymerization of the appropriate monomers, it is frequently more convenient to prepare the desired polymers by running an interchange reaction on a copolymer of ethylene and an acrylate or methacrylate ester. Where the oleyl or erucyl ester copolymer is desired, this can be prepared by running a simple ester interchange reaction by techniques which are known in the art and illustrated in Example I. Where the amide copolymers are desired, an ammonolysis interchange reaction will be run with either oleyl or erucyl amine as illustrated in Example II.

A particularly desired species of copolymer is obtained by subjecting an ethylene lower acrylate ester copolymer to an ammonolysis reaction employing as the amine a mixture of ammonia and either oleyl or erucyl amine, usually in a molar ratio of 0.5/1.0 to 3.0/1.0. Copolymers containing groups of both (b) and (c) can be obtained by (1) running a partial ester interchange on an ethylene lower acrylate ester copolymer, (2) recovering the resulting polymer, and (3) subjecting the resulting polymer to an ammonolysis reaction.

The copolymers of this invention and blends thereof with ethylene homopolymers can be used for diverse purposes such as the manufacture of molded articles, the coating of paper, and conversion to self supporting films. The techniques for manufacturing such articles will be essentially comparable to those presently employed with ethylene homopolymers. For example, the copolymers of this invention and blends thereof with ethylene homopolymers can be converted into film by the well known blown film extrusion technique. Such copolymers and blends thereof with ethylene homopolymers are particularly useful in manufacturing film by the chill roll casting technique in which the polymer is extruded at a die temperature of at least about 500 degrees F. It has been observed that higher than conventional extrusion temperatures can be used without encountering the difficulties normally associated with ethylene homopolymer containing externally added slip agents in which a portion of the slip agent is lost through volatilization at high extrusion temperatures. The use of higher temperatures enables film manufacturers to obtain higher rates of production and concomitantly lower manufacturing costs.

The above descriptions and particularly the examples are set forth for purposes of illustration only. Many variations and modifications of the specific procedures illustrated will be apparent to those skilled in the art and can be made without departing from the spirit and scope of the invention herein described.

I claim:
1. An ethylene copolymer containing therein (a) polymerized ethylene groups and at least one polymerized monomer selected from the group consisting of (b):

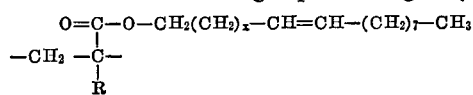

and (c):

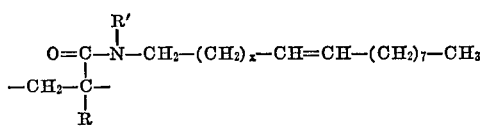

wherein x is 7 or 11 and R and R' are independently selected from the group consisting of hydrogen and a methyl group, said groups (a) constituting at least 50 mol percent of the polymerized monomer units contained in said copolymer and said groups selected from the group of (b) and (c) constituting at least about 5 mol percent of the monomer units contained in said copolymer.

2. A copolymer of claim 1 wherein said copolymer contains therein no polymerized monomer units of (c).

3. A copolymer of claim 1 wherein said copolymer contains therein no polymerized monomer units of (b).

4. A copolymer of claim 1 wherein said copolymer also contains therein polymerized monomer groups of the formula:

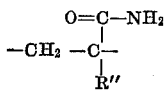

where $R''$ is selected from the group consisting of hydrogen and a methyl group.

5. A self-supporting film prepared from a copolymer of claim 1.

References Cited

UNITED STATES PATENTS 3,350,372   10/1967   Anspon et al. _____ 260—86.7
3,458,487   7/1969    Mortimer _____ 260—80.73

JOSEPH L. SCHOFER, Primary Examiner

J. KIGHT, Assistant Examiner

U.S. Cl. X.R.

260—80.73, 80.81